United States Patent
Ashizaki et al.

(10) Patent No.: US 8,325,464 B2
(45) Date of Patent: Dec. 4, 2012

(54) COIN TYPE ELECTRIC DOUBLE-LAYERED CAPACITOR, AND CAPACITOR-PACKAGED ELEMENT

(75) Inventors: Masashige Ashizaki, Osaka (JP); Masayuki Sato, Osaka (JP); Nario Niibo, Osaka (JP); Hiroaki Higashino, Osaka (JP)

(73) Assignee: Panasonic Corporation, Osaka (JP)

( * ) Notice: Subject to any disclaimer, the term of this patent is extended or adjusted under 35 U.S.C. 154(b) by 294 days.

(21) Appl. No.: 12/746,281

(22) PCT Filed: Dec. 16, 2008

(86) PCT No.: PCT/JP2008/003782
§ 371 (c)(1),
(2), (4) Date: Jun. 4, 2010

(87) PCT Pub. No.: WO2009/078169
PCT Pub. Date: Jun. 25, 2009

(65) Prior Publication Data
US 2010/0252314 A1    Oct. 7, 2010

(30) Foreign Application Priority Data
Dec. 18, 2007   (JP) ................... 2007-325568

(51) Int. Cl.
*H01G 9/00* (2006.01)
(52) U.S. Cl. ........................................ 361/502
(58) Field of Classification Search .................. 361/502
See application file for complete search history.

(56) References Cited

U.S. PATENT DOCUMENTS

| | | | |
|---|---|---|---|
| 6,733,544 B2 * | 5/2004 | Takasugi et al. | 29/25.03 |
| 6,771,486 B2 * | 8/2004 | Morikawa et al. | 361/502 |
| 7,031,140 B2 * | 4/2006 | Omura et al. | 361/517 |
| 7,742,280 B2 | 6/2010 | Sato et al. | |
| 2003/0007316 A1 * | 1/2003 | Takasugi et al. | 361/502 |
| 2005/0207095 A1 * | 9/2005 | Omura et al. | 361/502 |
| 2009/0176154 A1 * | 7/2009 | Sato et al. | 429/164 |

FOREIGN PATENT DOCUMENTS

CN    1557030 A    12/2004
(Continued)

OTHER PUBLICATIONS

International Search Report for PCT/JP2008/003782.
(Continued)

*Primary Examiner* — Eric Thomas
(74) *Attorney, Agent, or Firm* — Pearne & Gordon LLP (57) ABSTRACT

A coin-type electric double-layered capacitor of the present invention includes: a capacitor element; a lower cover for housing the capacitor element impregnated with an electrolyte; an upper cover for sealing an opening of the lower cover through an insulating ring-shaped packing; an upper terminal plate having one end portion connected to an outer surface of the upper cover; and a lower terminal plate having a first end portion connected to an outer surface of the lower cover and a second end portion provided with a through hole, the capacitor being configured such that at least part of the through hole is opened without being covered by an outer surface located on a bottom of the lower cover.

5 Claims, 5 Drawing Sheets

FOREIGN PATENT DOCUMENTS

| | | |
|---|---|---|
| CN | 1886814 A | 12/2006 |
| JP | H05-28025 A | 4/1993 |
| JP | 07-022277 A | 1/1995 |
| JP | 2002-170551 A | 6/2002 |
| JP | 2007-208137 A | 8/2007 |
| JP | 4250528 B2 | 1/2009 |
| WO | 2008-096480 A1 | 8/2008 |

OTHER PUBLICATIONS

JP 2002-170551 A dated Jun. 14, 2002 (machine translation for full text of JP 2002-170551 A).

JP 05-028025 U dated Apr. 9, 1993 (machine translation for full text of JP 05-028025 U).

* cited by examiner

COIN TYPE ELECTRIC DOUBLE-LAYERED CAPACITOR, AND CAPACITOR-PACKAGED ELEMENT

TECHNICAL FIELD

The present invention relates to a coin-type electric double-layered capacitor which is used for a power supply for backup of electronic equipment, and particularly mounted on a substrate inside the power supply or the like.

BACKGROUND ART

In recent years, with miniaturization of an internal device of electronic equipment having been advanced for a variety of purposes, miniaturization of each component constituting the internal device, such as a power supply, has also been desired. However, with a mounting board for use in the miniaturized internal device also miniaturized, there has been a problem in that a connection area of each component to be mounted on this mounting board cannot be sufficiently ensured and fixing strength of each component thus cannot be held. Further, since the start of mounting of a coin-type electric double-layered capacitor as such a component in portable electronic equipment, the coin-type electric double-layered capacitor has also been desired to have fixing strength capable of withstanding impact from any direction on the assumption of a variety of equipment usage patterns.

Incidentally, as a fixing method for connecting the coin-type electric double-layered capacitor to the mounting board in consideration of efficient mass-production, reflow-soldering has generally been conducted. However, in the case of mass-producing mounting boards each fixed with the coin-type electric double-layered capacitor by means of this reflow-soldering, it is difficult to unify a condition of fixing of the coin-type electric double-layered capacitor to each mounting board by solder. Therefore, there has thus been a problem in that a mounting board having insufficient fixing strength and insufficiently fixed with the coin-type electric double-layered capacitor may be produced.

Such a problem with the connection of the conventional coin-type electric double-layered capacitor to the mounting board is specifically described with reference to drawings.

Figure 6A:
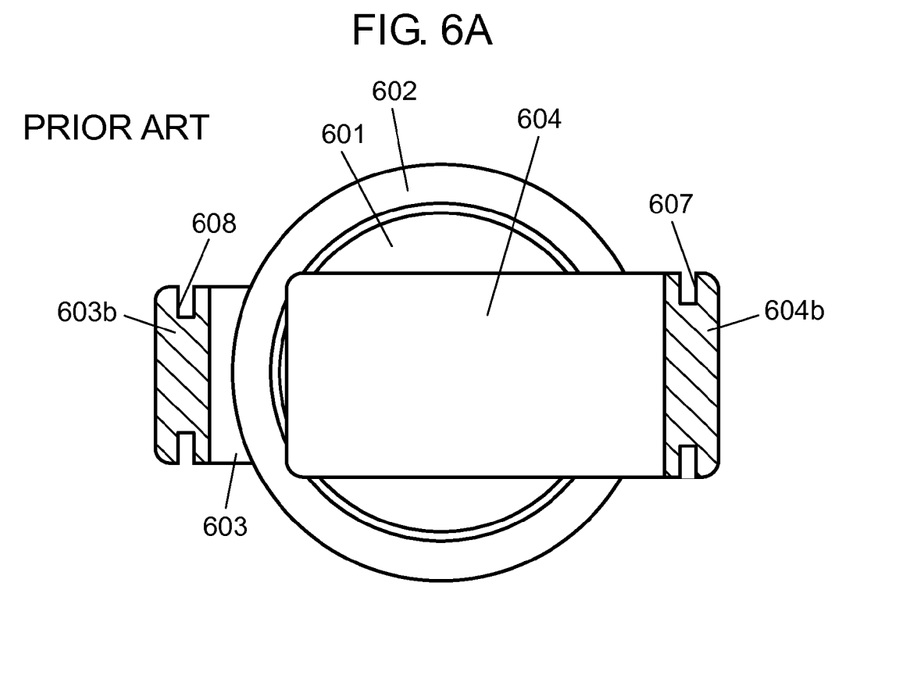
FIG. 6A is a top view showing a configuration of a conventional coin-type electric double-layered capacitor.
Figure 6B:
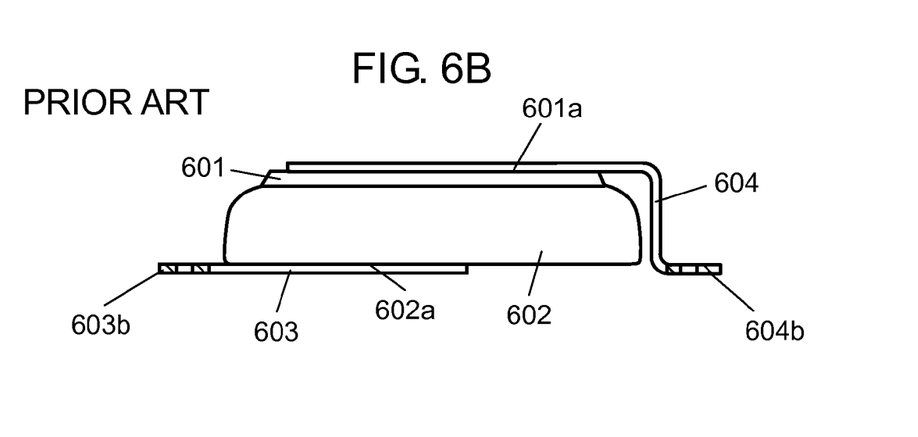
FIG. 6B is a side view showing the configuration of the conventional coin-type electric double-layered capacitor.

FIG. 6A is a top view showing a configuration of a conventional coin-type electric double-layered capacitor, and FIG. 6B is a side view of a configuration of the same coin-type electric double-layered capacitor.

As shown in FIGS. 6A and 6B, the conventional coin-type electric double-layered capacitor is configured such that a capacitor element (not shown) for charging and discharging electricity is arranged inside and surrounded by use of metal-made upper cover 601 and lower cover 602, which is caulked through a ring-shaped packing having insulating properties. Upper cover 601 and lower cover 602 are electrically connected with the capacitor element, thereby to have polarities different from those of upper cover 601 and lower cover 602 respectively, constituting a body section of the coin-type electric double-layered capacitor. Further, upper terminal plate 604 is electrically connected with outer surface 601a of upper cover 601. This upper terminal plate 604 forms a step shape in a longitudinal direction, and is electrically connected in the state of being in contact with the surface of a mounting board (not shown) located below the coin-type electric double-layered capacitor. Further, upper terminal plate 604 is configured to have plated section 604b, having been subjected to plating processing, at its one end portion in the longitudinal direction which is electrically connected with the mounting board. Moreover, notched section 607 is provided on each side surface in a width direction of this plated section 604b.

Lower terminal plate 603 is electrically connected to outer surface 602a of lower cover 602. Lower terminal plate 603 has a flat plate shape, and is electrically connected in the state of being in contact with the surface of the mounting board located below this lower terminal plate 603. Similarly to upper terminal plate 604, lower terminal plate 603 is also configured to have plated section 603b, having been subjected to plating processing, at its one end portion in the longitudinal direction which is electrically connected with the mounting board. Moreover, similarly to upper terminal plate 604, notched section 608 is provided on each side surface in the width direction of this plated section 603b.

With such a configuration, in the conventional coin-type electric double-layered capacitor, at the time of independently connecting upper terminal plate 604 and lower terminal plate 603 to the mounting board through solder, surface areas of the side surfaces of plated sections 603b, 604b are extended due to provision of notched sections 607, 608, to increase an area for forming a solder fillet. This can increase areas of the connection portions between plated sections 603b, 604b and the mounting board, so as to enhance fixing strength of the coin-type electric double-layered capacitor to the mounting board.

Namely, in the case of plated sections 603b, 604b not having respective notched sections 607, 608, the connection portions between plated sections 603b, 604b and the mounting board are fixed by solder fillets formed on the side surfaces in the longitudinal direction and both side surfaces in the width direction of plated sections 603b, 604b. As opposed to this, in the case of plated sections 603b, 604b having respective notched sections 607, 608, the solder fillets formed on the side surfaces in the longitudinal direction of plated sections 603b, 604b are also formed on the side surfaces of notched sections 607, 608, and hence the fillets increase. This can efficiently enhance the fixing strength of the connection portions between plated sections 603b, 604b and the mounting board.

It should be noted that as document information related to this prior art, for example, Patent Document 1 is known.

However, as for the coin-type electric double-layered capacitor, further miniaturization has been desired, and there has been a problem of difficulty in ensuring fixing strength at the time of connecting a further miniaturized coin-type electric double-layered capacitor to the mounting board. Namely, there has been a problem of difficulty in realizing a coin-type electric double-layered capacitor that is further miniaturized and capable of sufficiently ensuring fixing strength of a connection portion with a mounting board at the time of reflow-soldering the coin-type electric double-layered capacitor to the mounting board.

[Patent Document 1] Unexamined Japanese Patent Publication No. 2007-208137

DISCLOSURE OF THE INVENTION

The present invention solves the above problem, and provides a coin-type electric double-layered capacitor having excellent fixing strength even after reflow-soldering, and simultaneously achieving its miniaturization.

A coin-type electric double-layered capacitor of the present invention includes: a capacitor element with a pair of electrodes placed such that the electrodes confront each other through an insulating separator; a lower cover for housing the capacitor element impregnated with an electrolyte; an upper cover for sealing an opening of the lower cover through an insulating ring-shaped packing; an upper terminal plate having one end portion connected to an outer surface of the upper cover; and a lower terminal plate having a first end portion connected to an outer surface of the lower cover and a second end portion provided with a through hole. The coin-type electric double-layered capacitor of the present invention is configured such that at least part of the through hole is opened without being covered by an outer surface of a bottom of the lower cover.

As thus described, it is configured that the through hole is provided in a portion of the lower terminal plate which is connected with the mounting board, whereby at the time of fixing to the mounting board by solder, it is possible to form a solder fillet not only on the outer peripheral surface of the lower terminal plate, but also, for example, at a substantially central part of the end portion of the lower terminal plate in a dispersed manner, so as to enhance the fixing strength to the mounting board.

Further, the through hole in the lower terminal plate is configured to be located so as not to be covered by the outer surface of the bottom of the lower cover and to be opened such that part thereof has a portion certainly in contact with an outside air.

This leads to reliable degasification at the time of soldering, and stable formation of a solder fillet covering the inner peripheral surface of the through hole.

It is therefore possible to ensure high fixing strength in a connection portion with the mounting board. Simultaneously with that, it is possible to suppress a projecting length of the lower terminal plate from the body section of the coin-type electric double-layered capacitor to the minimum, so as to seek miniaturization of the coin-type electric double-layered capacitor.

Moreover, a capacitor-packaged unit of the present invention includes: the coin-type electric double-layered capacitor described above; a mounting board to which the coin-type electric double-layered capacitor to be mounted; and solder for electrically connecting to the coin-type electric double-layered capacitor to the mounting board. The capacitor-packaged unit is configured such that in a case where the capacitor is soldered onto the mounting board, fillets formed respectively on the inner peripheral surface of the through hole and the outer peripheral surface of the lower terminal plate are united with the solder by use of at least part of the through hole, which solder exposedly spreads on a top face of the lower terminal plate in a state continuous to the fillets.

With such a configuration, it is possible to realize a small-sized compact capacitor-packaged unit capable of ensuring high fixing strength in a connection portion with the mounting board, and simultaneously suppressing a projecting length of the lower terminal plate from the body section of the coin-type electric double-layered capacitor to the minimum.

REFERENCE MARKS IN THE DRAWINGS 1, 101 upper cover
2, 102 lower cover
3, 103, 203, 303, 403, 503 lower terminal plate
3a, 4a, 103a, 104a welding portion
3b, 4b, 103b, 104b, 203b, 303b, 403b, 503b connection portion
3c side surface
4, 104 upper terminal plate
5, 105, 205, 405 through hole
5c, 105c inner peripheral surface
5d, 103d outer peripheral surface
5e opening
6a, 6b electrode
7a, 7b collector
8a, 8b polarized electrode layer
9 separator
10, 110 capacitor element
11, 111 ring-shaped packing
12 bent section
103c top surface
113a, 113b fillet (solder)
113c solder
114 mounting board
315 notched section

PREFERRED EMBODIMENTS FOR CARRYING OUT OF THE INVENTION

Hereinafter, embodiments of the present invention are described with reference to the drawings. In the following drawings, each of the same elements is provided with the same numeral, and its explanation may thus not be repeated.

Embodiment 1

Figure 1A:
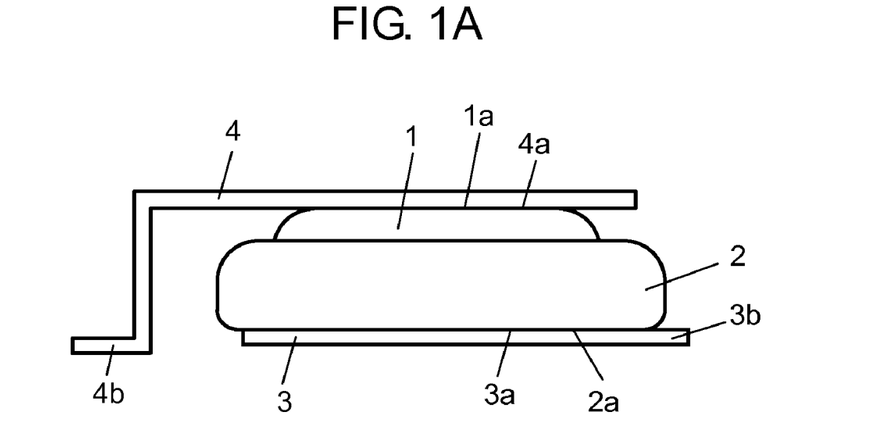
FIG. 1A is a side view showing a configuration of a coin-type electric double-layered capacitor in Embodiment 1 of the present invention.
Figure 1B:
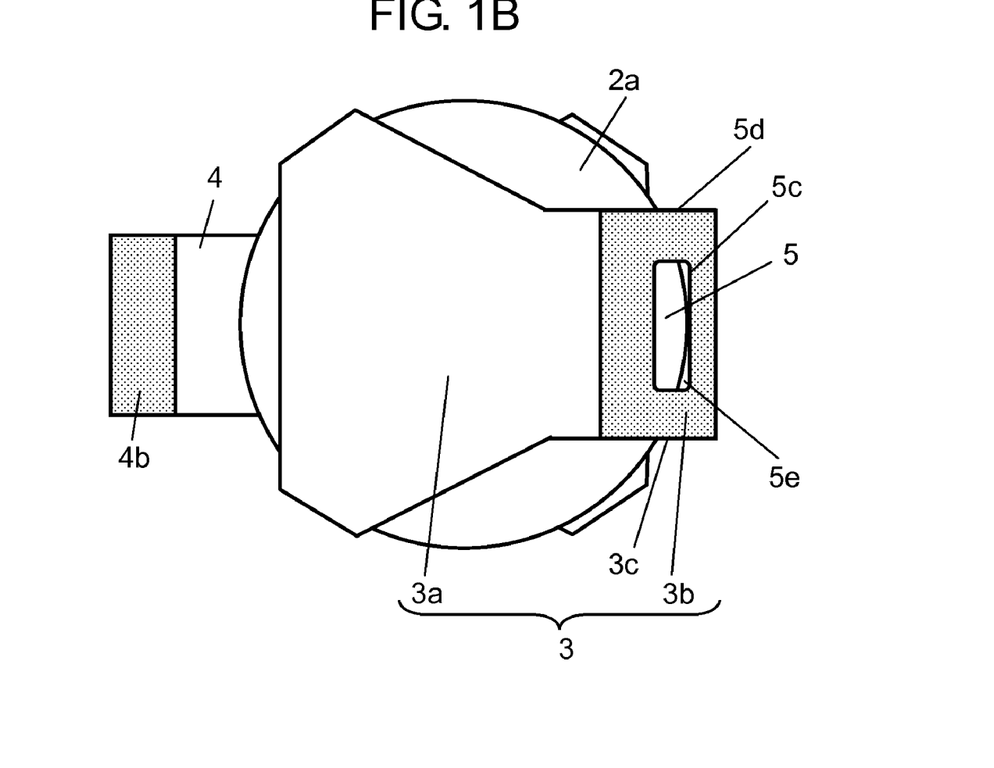
FIG. 1B is a bottom view showing the configuration of the coin-type electric double-layered capacitor in Embodiment 1 of the present invention.

FIGS. 1A and 1B are respectively a side view and a bottom view which show a configuration of a coin-type electric double-layered capacitor in Embodiment 1 of the present invention.

Figure 2:
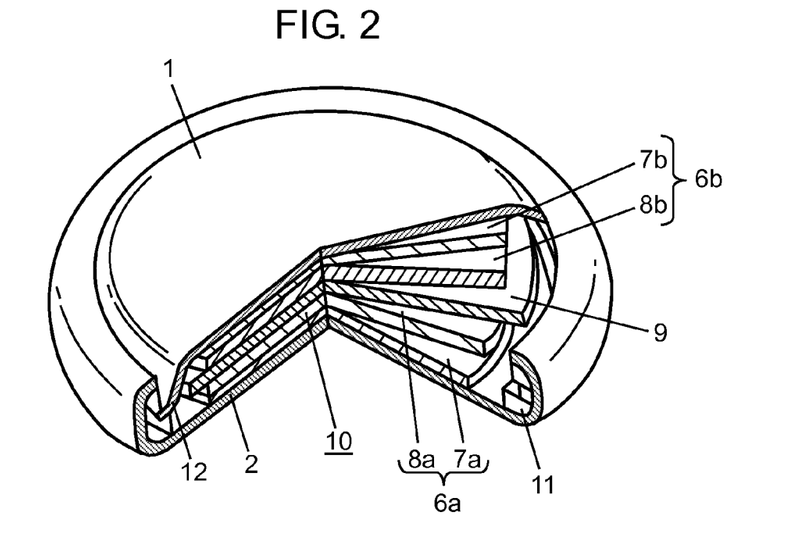
FIG. 2 is a partially cut-off perspective view of the coin-type electric double-layered capacitor in Embodiment 1 of the present invention before being connected to an upper terminal plate and a lower terminal plate.

FIG. 2 is a partially cut-out perspective view of the coin-type electric double-layered capacitor in Embodiment 1 of the present invention before being connected to an upper terminal plate and a lower terminal plate of the coin-type electric double-layered capacitor.

FIGS. 1A and 1B show the configuration of the coin-type electric double-layered capacitor of the present invention which is provided with upper cover 1, lower cover 2, lower terminal plate 3, upper terminal plate 4, through hole 5, and the like, and details of these are described later.

First, an internal configuration of capacitor element 10 constituting a substantial part of the coin-type electric double-layered capacitor according to Embodiment 1 is described with reference to FIG. 2.

In FIG. 2, electrodes 6a, 6b respectively show a positive electrode and a negative electrode. In electrodes 6a, 6b, polarized electrode layers 8a, 8b configured of activated carbons, a binder for bundling the activated carbons, and conductive auxiliaries made of aluminum are respectively formed on one sides of collectors 7a, 7b. Electrodes 6a, 6b are installed and arranged such that the surfaces thereof which are formed with polarized electrode layers 8a, 8b are opposed to each other in directions to mutually other electrodes 6b, 6a. Electricity stored inside the capacitor can be collected through these electrodes 6a, 6b, to be discharged to an external circuit or the like, and the electricity from the external circuit or the like can again be stored. It is to be noted that, although the conductive layers made of aluminum are used for collectors 7a, 7b as an example, conductive layers made of metal, such as silver or copper, carbon or the like may also be used. Further, as for these conductive layers, ones in paste form, such as silver paste or gold paste, may also be used as well as ones in plate form.

Separator 9 shown in FIG. 2 has insulating properties, and for example, a paper-made material is used therefor. Separator 9 is installed at a position interposed between electrodes 6a, 6b.

As described above, capacitor element 10 is configured as shown in FIG. 2, including electrodes 6a, 6b, collectors 7a, 7b, polarized electrode layers 8a, 8b and separator 9.

Capacitor element 10 configured as thus described is impregnated with an electrolyte (not shown) such as an electrolyte for driving, and housed as put between upper cover 1 and lower cover 2 from above and below. At this time, capacitor element 10 is sealed by caulking an opening of upper cover 1 and an opening of lower cover 2. Simultaneously, upper cover 1 and lower cover 2 are respectively connected with collectors 7a, 7b of electrodes 6a, 6b in capacitor element 10, to serve as extractor electrodes of capacitor element 10.

At the time of caulking upper cover 1 and lower cover 2, ring-shaped packing 11 having insulating properties is installed so as to come into intimate contact with the internal side surface of lower cover 2. Subsequently, the tip of the opening of upper cover 1 is subjected to bending processing in a direction getting away from a central axis of upper cover 1, to form bent section 12, and bent section 12 and ring-shaped packing 11 are placed as a configuration to be press-fitted to each other. Curling processing is then performed on the tip of the opening of lower cover 2 toward a central axis of lower cover 2, thereby to press-fit part of ring-shaped packing 11 to the tip of the opening of lower cover 2. Thereby, since the body of upper cover 1 besides bent section 12 is present inside bent section 12, upper cover 1 and lower cover 2 can be combined with each other in the state of ring-shaped packing 11 preventing direct contact between upper cover 1 and lower cover 2.

In this case, as a material for upper cover 1, for example, stainless steel SUS 304 may be used and as a material for lower cover 2, for example, highly corrosion-resistant stainless may be used. Both are materials excellent in corrosion resistance and processability.

Next, the coin-type electric double-layered capacitor of present Embodiment 1 is specifically described with reference to FIGS. 1A and 1B. With capacitor element 10 of the coin-type electric double-layered capacitor and upper cover 1 as well as lower cover 2 for use in housing capacitor element 10 having been described in FIG. 2, lower terminal plate 3 and upper terminal plate 4 connected to these are next described.

First, upper terminal plate 4 is described.

As shown in FIGS. 1A and 1B, upper terminal plate 4 is electrically connected to upper cover 1 by welding of welding portion 4a thereto. A shape (not shown) of this welding portion 4a of upper terminal plate 4 is, for example, a substantially triangular, for example similarly to that of welding portion 3a of lower terminal plate 3 which is shown in FIG. 1B. Further, upper terminal plate 4 is configured such that its flat plate section is extended from one end of welding portion 4a and bent downward, to have connection portion 4b as a flat external connection portion at a tip portion of this flat plate section.

Moreover, connection portion 4b is configured so as to be substantially as high as and in parallel with later-described welding portion 3a of lower terminal plate 3. In addition, as a material for upper terminal plate 4, for example, stainless steel SUS 304 or the like may be used.

Next, lower terminal plate 3 is described.

Lower terminal plate 3 has a flat plate shape, and welding portion 3a as a portion electrically connected to lower cover 2 by welding forms a substantially triangular shape, for example as shown in FIG. 1B, for the purpose of ensuring a connection area and a welding area. Further, lower terminal plate 3 is configured to have connection portion 3b as an external connection section extending from one end of welding portion 3a. It should be noted that as a material for lower terminal plate 3, for example, stainless steel SUS 304 or the like may be used similarly to upper terminal plate 4.

Electrical connection between connection portion 3b as the external connection section of lower terminal plate 3 and a land portion (not shown) provided on the surface of the mounting board is performed generally by reflow-soldering, which enables a large amount of connection processing in a simplified manner for a short period of time, in consideration of mass-productivity. Solder for use in present Embodiment 1 is, for example, cream solder, chiefly including tin, copper, silver, flux, and the like, for example. Further, melted solder as a simple substance cannot be attached to the surface of stainless steel SUS 304 for use in lower terminal plate 3 in present Embodiment 1. Therefore, reflow-soldering by use of cream solder is facilitated by first, for example, flash-plating the whole surface of connection portion 3b with nickel and then plating the plated surface with tin.

Moreover, it is configured that connection portion 3b of lower terminal plate 3 is provided with through hole 5. Generally, fixing strength of reflow-soldering in a contact surface portion of connection portion 3b with the mounting board is decided based upon a width of a formation range of a solder fillet (hereinafter referred to as "fillet") formed on side surface 3c of connection portion 3b rather than a bonding condition of the solder in that portion. This is because the fillet has a small number of voids inside the solder as compared with other bonding places, resulting in constitutionally high strength of the solder itself. Therefore, at the end portion of connection portion 3b of lower terminal plate 3 as connection portion 3b, through hole 5 is provided at the substantially center of that end portion. Thereby, a fillet is formed on inner peripheral surface 5c of through hole 5 at the substantially center of the end portion of connection portion 3b. It is thereby possible not only to simply extend the formation range of the fillet up to inner peripheral surface 5c of through hole 5 in addition to side surface 3c of connection portion 3b, but also to form fillets at a plurality of different places in connection portion 3b, so as to significantly improve the fixing strength of the connection portion.

Moreover, in order to realize further miniaturization of the coin-type electric double-layered capacitor, a position to be provided with through hole 5 is brought as close to welding portion 3a as possible. This controls a length of lower terminal plate 3 projecting from lower cover 2. However, when the position to be provided with through hole 5 comes excessively close to welding portion 3a, the opening of through hole 5 is completely covered by outer surface 2a of the bottom of lower cover 2, and an area of an opening in contact with the outside air thus becomes zero. Thereby, a sealed space is created on the solder at the time of reflow-soldering, which makes it difficult for solder melted by internal pressure of this sealed space to go up along the side surface of connection portion 3b through use of surface tension, thus leading to imperfect fillet formation. Accordingly, fixing strength of connection portion 3b decreases.

However, the coin-type electric double-layered capacitor of present Embodiment 1 includes: capacitor element 10 with a pair of electrodes 6a, 6b placed such that the electrodes confront each other through insulating separator 9; lower cover 2 for housing capacitor element 10 impregnated with an electrolyte; upper cover 1 for sealing an opening of lower cover 2 through insulating ring-shaped packing 11; upper terminal plate 4 having one end portion connected to outer surface 1a of upper cover 1; and lower terminal plate 3 having a first end portion connected to outer surface 2a of lower cover 2 and a second end portion provided with through hole 5. In the coin-type electric double-layered capacitor of present Embodiment 1, at least part of through hole 5 is opened without being covered by outer surface 2a of the bottom of lower cover 2.

As thus described, it is configured that through hole 5 is provided in a portion of lower terminal plate 3 which is connected with the mounting board (not shown), whereby at the time of fixing to the mounting board by solder, it is possible to form a fillet not only on the outer peripheral surface 5d of lower terminal plate 3, but also, for example, at a substantially central part of the end portion of lower terminal plate 3 in a dispersed state, so as to enhance the fixing strength to the mounting board.

Further, through hole 5 in lower terminal plate 3 is located so as not to be covered by outer surface 2a placed at the bottom of lower cover 2 and to be opened such that part thereof has a portion as opening 5e which is certainly in contact with the outside air. This leads to reliable degasification at the time of soldering, and a fillet covering inner peripheral surface 5c of through hole 5 is thus stably formed.

It is therefore possible to ensure high fixing strength in a connection portion with the mounting board. Simultaneously with that, it is possible in the coin-type electric double-layered capacitor to suppress a projecting length of lower terminal plate 3 from capacitor element 10 to the minimum, so as to realize miniaturization of the coin-type electric double-layered capacitor.

Further, as for the position to be provided with through hole 5 in the foregoing coin-type electric double-layered capacitor, at least part of the opening of through hole 5 is placed at a position where an outline of outer surface 2a of lower cover 2 runs. However, even with through hole 5 formed and placed outside the outline of outer surface 2a of the bottom of lower cover 2, the effect of stably forming a fillet obtained by providing through hole 5 to ensure high fixing strength in a connection portion to the mounting board is not lost.

Moreover, also in the case of forming a configuration where lower terminal plate 3 is made stepwise and steps are provided in welding portion 3a with lower cover 2 and connection portion 3b with the mounting board, it is possible to prevent outer surface 2a of the bottom of lower cover 2 from covering the opening of through hole 5, and simultaneously suppress the projecting length of lower terminal plate 3 from lower cover 2. Accordingly, as compared with the configuration of the conventional coin-type electric double-layered capacitor shown in FIGS. 6A and 6B, the above configuration can further enhance the fixing strength to the mounting board, and can also realize miniaturization of the whole of the coin-type electric double-layered capacitor. Meanwhile, the coin-type electric double-layered capacitor is slightly high as compared with the case of the coin-type electric double-layered capacitor of the present invention using forgoing lower terminal plate 3 in flat plate shape.

It is to be noted that, although through hole 5 is for example in a rectangular shape in present Embodiment 1, a similar effect is exerted even with through hole 5 being in any shape so long as it is formed and placed in circular, elliptical, triangle or polygonal shape or some other shape. Further, the number of through holes 5 may not just be one but also be plural.

Embodiment 2

Figure 3A:
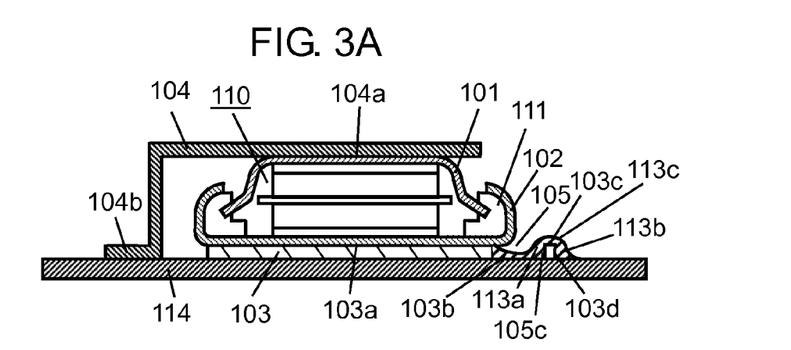
FIG. 3A is a sectional view in a case where a coin-type electric double-layered capacitor in Embodiment 2 of the present invention is fixed by solder onto a mounting board.
Figure 3B:
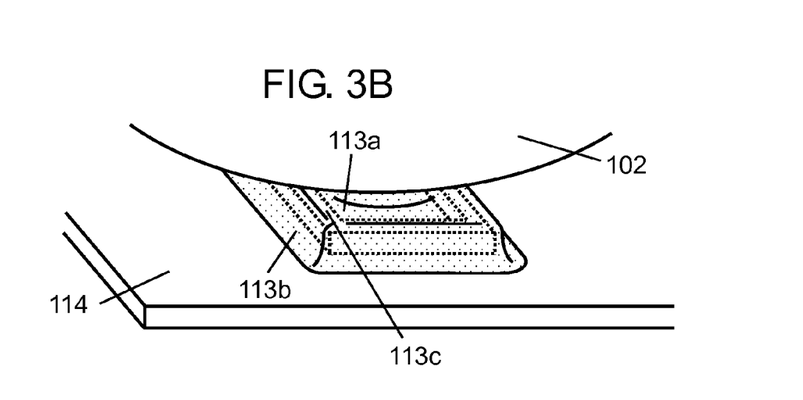
FIG. 3B is a substantial-part enlarged perspective view in the case where the coin-type electric double-layered capacitor in Embodiment 2 of the present invention is fixed by the solder onto the mounting board.

FIG. 3A is a sectional view in a case where a coin-type electric double-layered capacitor is fixed by solder onto a mounting board in Embodiment 2 of the present invention. FIG. 3B is a perspective view in the case where the same coin-type electric double-layered capacitor is fixed by the solder onto the mounting board. In this case, capacitor element 110 is placed as surrounded by upper cover 101 and lower cover 102, and these upper cover 101 and lower cover 102 are in intimate contact with each other through ring-shaped packing 111.

The coin-type electric double-layered capacitor in FIGS. 3A and 3B is different from the coin-type electric double-layered capacitor in Embodiment 1 shown in FIG. 1 in a respect described below.

Namely, as shown in FIGS. 3A and 3B, at the time of fixing lower terminal plate 103 onto the mounting board at a position of through hole 105, fillet 113a is formed on inner peripheral surface 105c of through hole 105. Along with this, solder 113c spreading as exposed is formed on upper surface 103c of lower terminal plate 103, and fillet 113b is formed on outer peripheral surface 103d of lower terminal plate 103. This capacitor is different from the coin-type electric double-layered capacitor in Embodiment 1 in that the solder forming fillets 113a, 113b and solder 113c spreading as exposed on upper surface 103c of lower terminal plate 103 are placed so as to be united. It is to be noted that upper terminal plate 104 is electrically connected to upper cover 101 through welding portion 104a, and lower terminal plate 103 is electrically connected to lower cover 102 through welding portion 103a. As shown in FIG. 3A, similarly to Embodiment 1, upper terminal plate 104 has a shape bent at a midpoint thereof, and electrically connected to mounting board 114 by connection portion 104b.

Here, in the case of fixing the coin-type electric double-layered capacitor onto mounting board 114 by use of solder, fillet 113a is formed on inner peripheral surface 105c of through hole 105. It should be noted that this fillet 113a is formed so as to be in adjacent contact with inner peripheral surface 105c. At this time, in fillet 113a, the melted solder not only forms a back fillet, but also crawls up inner peripheral surface 105c of through hole 105 and spreads as exposed on upper surface 103c of lower terminal plate 103. It is considered that such a phenomenon occurs when part of air, generated by degasification from the inside of the solder due to melting of the solder, passes through hole 105. The flow of part of the air pushes the solder which craws up through hole 105 with intent to form a back fillet, to give further momentum to the spread of the solder. This results in that the solder is given the momentum to such a degree as to expose from connection portion 103b to upper surface 103c.

Meanwhile, also on outer peripheral surface 103d of lower terminal plate 103, the melted solder not only forms the back fillet, but also crawls up outer peripheral surface 103d of the end portion of lower terminal plate 103, and similarly spreads as exposed on upper surface 103c of lower terminal plate 103.

However, there are limits on a range in which the solder crawls up and spreads from inner peripheral surface 105c of through hole 105 and a range in which the solder crawls up and spreads from outer peripheral surface 103d of lower terminal plate 103. For this reason, through hole 105 in lower terminal plate 103 is placed at a position with a distance where the solder that crawls up and spreads from inner peripheral surface 105c of through hole 105 and the solder that crawls up and spreads from outer peripheral surface 103d of lower terminal plate 103 can come into contact with each other.

With such arrangement configured, the solder that crawls up and spreads from inner peripheral surface 105c of through hole 105 and the solder that crawls up and spreads from outer peripheral surface 103d of lower terminal plate 103 come into contact and are then united. Namely, fillets 113a, 113b are connected by solder 113c and unified as solder as shown in FIGS. 3A and 3B.

Thereby obtained is an effect that the solder covers a large part of the surface of the end portion of lower terminal plate 103 to become the connection section of mounting board 114. Consequently, as for the fixing strength of the coin-type electric double-layered capacitor to mounting board 114, further higher fixing strength can be obtained than fixing strength obtained by formation of fillets 113a, 113b and fixing only by fillets 113a, 113b.

Specifically, in the case of coin-type electric double-layered capacitor of present Embodiment 2 being fixed onto mounting board 114 by solder, fillets 113a, 113b are formed by solder on inner peripheral surface 105c of through hole 105 and outer peripheral surface 103d of lower terminal plate 103. Along with this, it is configured that through hole 105 in lower terminal plate 103 is arranged at such a predetermined position as to unite the solder formed on upper surface 103c of lower terminal plate 103 with fillets 113a, 113b.

It should be noted that this through hole 105 is placed at a position as close as possible to the end portion of lower terminal plate 103 to become the connection section of mounting board 114. At this time, a lower limit of the position to which through hole 105 is close is set to such a degree that in terms of mechanical strength of lower terminal plate 103 itself, material strength of the end plate between through hole 105 and outer peripheral surface 103d of the end portion of lower terminal plate 103 can be ensured sufficiently for connecting and fixing the coin-type electric double-layered capacitor to mounting board 114.

Moreover, as means for setting such a distance of through hole 105 where the solder that crawls up and spreads from inner peripheral surface 105c of through hole 105 and the solder that crawls up and spreads from outer peripheral surface 103d of lower terminal plate 103 can come into contact with each other, it is effective to form the following configuration.

Specifically, other than adjustment of the position of through hole 105 in lower terminal plate 103, a thickness of lower terminal plate 103 between outer peripheral surface 103d of the end portion of lower terminal plate 103 and through hole 105 is partially reduced. It is thereby possible to sufficiently ensure the material strength of the end plate, and also to facilitate the solder that crawls up and spreads from inner peripheral surface 105c of through hole 105 and the solder that crawls up and spreads from outer peripheral surface 103d of lower terminal plate 103 to come into contact with each other, so as to facilitate unification of these solder.

Incidentally, in present Embodiment 2, as shown in FIGS. 3A and 3B, a capacitor-packaged unit may be configured which is provided with the foregoing coin-type electric double-layered capacitor, mounting board 114 on which this coin-type electric double-layered capacitor is mounted, solder 113a, 113b, 113c for electrically connecting the foregoing coin-type electric double-layered capacitor onto mounting board 114. In the case of fixing the foregoing coin-type electric double-layered capacitor onto mounting board 114 by solder 113a, 113b, 113c, this capacitor-packaged unit is configured such that fillets 113a, 113b respectively formed on inner peripheral surface 105c of through hole 105 and outer peripheral surface 103d of lower terminal plate 103 and solder 113c that spreads as exposed on upper surface 103c of lower terminal plate 103 continuously to fillets 113a, 113b are united by use of at least part of through hole 105.

With such a configuration, it is possible to realize a small-sized compact capacitor-packaged unit capable of ensuring high fixing strength in the connection portion with mounting board 114, and simultaneously suppressing a projecting length of lower terminal plate 103 from the body of the coin-type electric double-layered capacitor to the minimum.

In the following, further specific description is given with reference to examples.

Example 1

Figure 4A:
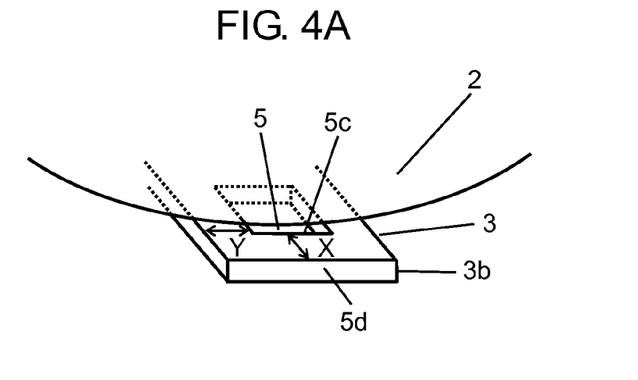
FIG. 4A is an enlarged perspective view showing a substantial part of the coin-type electric double-layered capacitor in Embodiment 1 of the present invention.

Example 1 is about an example of the coin-type electric double-layered capacitor in Embodiment 1 shown in FIGS. 1A and 1B and FIG. 2, which is produced in the following procedure. Here, FIG. 4A is a substantial-part enlarged perspective view of the coin-type electric double-layered capacitor in Embodiment 1 of the present invention, and a description is given in conjunction with this FIG. 4A.

First, the body section including capacitor element 10 of the coin-type electric double-layered capacitor is produced in the following procedure. As shown in FIG. 2, for example, polarized electrode layers 8a, 8b configured of activated carbons, binders for bundling the activated carbons, and conductive auxiliaries made of aluminum are respectively formed on one sides of collectors 7a, 7b, to give positive electrode 6a and negative electrode 6b.

Next, positive electrode 6a and negative electrode 6b are placed while the surfaces thereof formed with polarized electrode layers 8a, 8b are opposed to each other, and for example, insulating separator 9 made of paper is intervened between positive electrode 6a and negative electrode 6b, which are laminated to form capacitor element 10.

Subsequently, capacitor element 10 is impregnated with, for example, an electrolyte for driving. Thereafter, capacitor element 10 is housed in lower cover 2 made, for example, of a stainless material having high corrosion resistance. At this time, it is placed such that collector 7a of positive electrode 6a of capacitor element 10 comes into contact with lower cover 2. At the time of caulking upper cover 1 and lower cover 2, ring-shaped packing 11 having insulating properties is installed so as to come into intimate contact with an the internal side surface of lower cover 2.

Next, the opening of lower cover 2 is aligned with the opening of upper cover 1 made, for example, of stainless steel SUS 304 through insulating ring-shaped packing 11. The place where upper cover 1 and lower cover 2 are aligned is then caulked, and the opening of upper cover 1 and the opening of lower cover 2 are press-fitted to ring-shaped packing 11 for sealing. At this time, collector 7b of negative electrode 6b is made to come into contact with upper cover 1. As described above, the body section including capacitor element 10 of the coin-type electric double-layered capacitor is produced.

Subsequently, in the following procedure, an external terminal plate is connected to the body section of the coin-type electric double-layered capacitor, to make surface-mounting possible.

First, as shown in FIG. 1A, upper terminal plate 4 made, for example, of SUS 304 of stain steel is connected to the upper surface, namely upper cover 1, of the body section of the coin-type electric double-layered capacitor. This upper terminal plate 4 is previously subjected to bending processing, and a portion where upper terminal plate 4 comes into contact with the mounting board (not shown) is previously provided with connection portion 4b as a flat external connection section.

Thereafter, as shown in FIGS. 1B and 4A, lower terminal plate 3 made, for example, of stainless steel SUS 304 is connected to the lower surface of the body section, namely lower cover 2, of the coin-type electric double-layered capacitor. At this time, lower terminal plate 3 is placed such that its one end is projected from lower cover 2, and connection portion 3b with the mounting board is provided. This connection portion 3b is, for example, a rectangular flat plate with a thickness of 0.1 mm and has previously formed through hole 5, and the opening of this through hole 5 is made not to be completely covered by outer surface 2a of the bottom of lower cover 2. Namely, at least part of through hole 5 is not covered by outer surface 2a located on the bottom of lower cover 2 and is placed as the opening. Further, as shown in FIG. 4A, as the position of through hole 5 in lower terminal plate 3, distance X from the tip surface of connection portion 3b of lower terminal plate 3 and distance Y from each side surface of connection portion 3b of lower terminal plate 3 are both made to be, for example, 0.9 mm.

Example 2

Example 2 shows another example of the coin-type electric double-layered capacitor in Embodiment 1 shown in FIGS. 1A and 1B and FIG. 2.

Figure 4B:
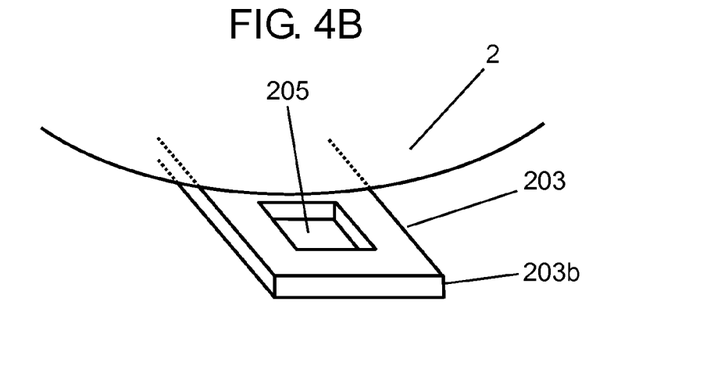
FIG. 4B is an enlarged perspective view showing a substantial part of another example of the coin-type electric double-layered capacitor in Embodiment 2 of the present invention.

Further, FIG. 4B is a substantial-part enlarged perspective view of another example of the coin-type electric double-layered capacitor in Embodiment 2 of the present invention, and a description is given in conjunction with FIG. 4B.

As shown in FIG. 4B, Example 2 is different from Example 1 in that connection portion 203b of lower terminal plate 203 is connected to lower cover 2 such that the whole of the opening of through hole 205 is exposed to the outside and is not covered by lower cover 2.

With such a configuration, gas which is generated in the case of fixing the coin-type electric double-layered capacitor onto the mounting board by solder is efficiently discharged from the opening of through hole 205, so that the coin-type electric double-layered capacitor can be strongly connected to the mounting board.

Example 3

Example 3 shows further another example of the coin-type electric double-layered capacitor in Embodiment 2 shown in FIGS. 3A and 3B. Further, FIG. 4C is a substantial-part enlarged perspective view of the coin-type electric double-layered capacitor in Embodiment 2 of the present invention, and a description is given in conjunction with FIG. 4C.

Figure 4C:
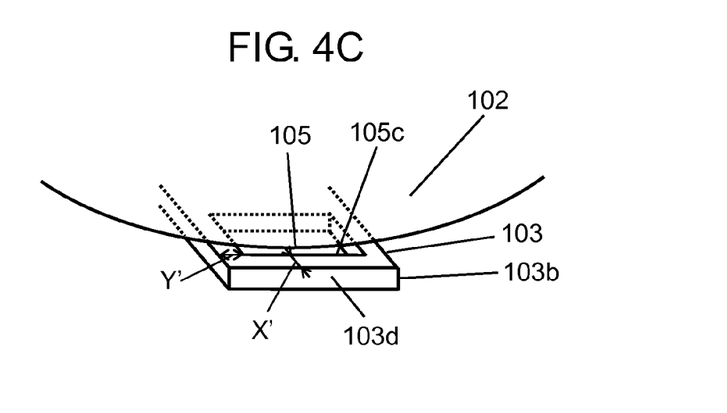
FIG. 4C is an enlarged perspective view showing a substantial part of the coin-type electric double-layered capacitor in Embodiment 2 of the present invention.

As shown in FIG. 4C, Example 3 is different from Example 1 in the position of through hole 105 in connection section 103b of lower terminal plate 103.

In Example 3, as the position of through hole 105 in lower terminal plate 103, distance X' from inner peripheral surface 105c of through hole 105 to outer peripheral surface 103d of connection portion 103b of lower terminal plate 103 and distance Y' to each side surface of connection portion 103b of lower terminal plate 103 are made to be, for example, 0.3 mm and 0.5 mm, respectively. Namely, as compared with Example 1, the position of through hole 105 in lower terminal plate 103 is further closer to outer peripheral surface 103d side as the tip side of lower terminal plate 103.

COMPARATIVE EXAMPLE

In order to verify a significant effect of the coin-type electric double-layered capacitor of the present invention by comparison with above Examples 1 to 3, Comparative Examples 1 to 3 concerning conventional coin-type electric double-layered capacitors are produced for comparison.

Figure 5A:
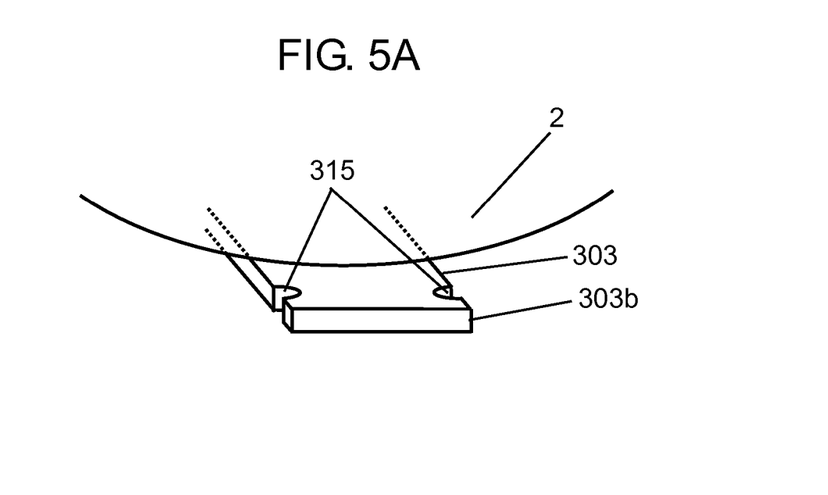
FIG. 5A is an enlarged perspective view showing a substantial part of a conventional coin-type electric double-layered capacitor.
Figure 5B:
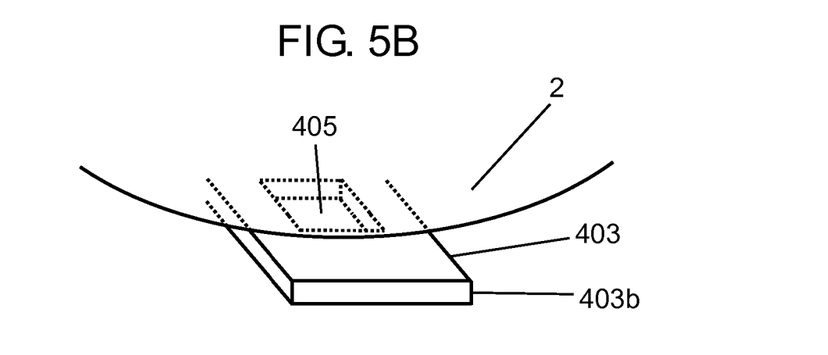
FIG. 5B is an enlarged perspective view showing a substantial part of another example of the conventional coin-type electric double-layered capacitor.
Figure 5C:
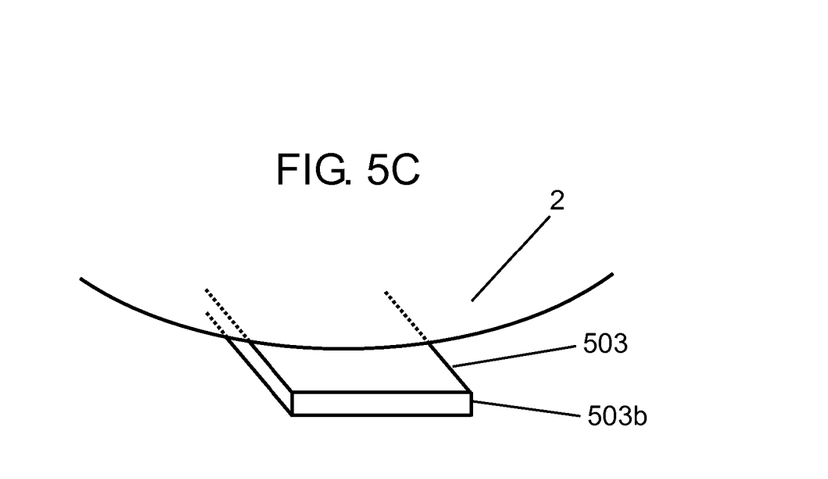
FIG. 5C is an enlarged perspective view showing a substantial part of another example of the conventional coin-type electric double-layered capacitor.

FIG. 5A is an enlarged perspective view showing a substantial part of a conventional coin-type electric double-layered capacitor. FIGS. 5B and 5C are each an enlarged perspective view showing a substantial part of another example of the conventional coin-type electric double-layered capacitor.

Comparative Example 1

As shown in FIG. 5A, Comparative Example 1 is different from Embodiment 1 in that notched section 315 is provided on the side surface of connection portion 303b of lower terminal plate 303 in place of a slit hole. Comparative Example 1 is different in the whole of that notched section 315 being further exposed to the outside and lower terminal plate 303 being connected to lower cover 2 so as not to be covered by lower cover 2.

Comparative Example 2

As shown in FIG. 5B, Comparative Example 2 is different from Example 1 in connection portion 403b of lower terminal plate 403 being connected to lower cover 2 such that the whole of the opening of through hole 405 is covered by the outer surface of the bottom of lower cover 2.

Comparative Example 3

As shown in FIG. 5C, Comparative Example 3 is different from Example 1 in that connection portion 503b of lower terminal plate 503 is provided with neither the through hole nor the notched section.

Here, 20 samples each of the coin-type electric double-layered capacitors of Examples 1 to 3 and Comparative Examples 1 to 3 are produced by reflow. Namely, for example on typical reflow conditions of a peak temperature being not lower than 260° C. and the time of not longer than 5 seconds, the coin-type electric double-layered capacitor is fixed by solder onto the mounting board. A comparative study is then conducted on fixing strengths of the samples fixed onto the mounting board. Results thereof are shown in Table 1. It should be noted that a thickness of the cream solder at this time is, for example, from 100 to 80 μm.

Further, as a method for measuring the fixing strength, a through hole is opened in the mounting board at a position mounted with the coin-type electric double-layered capacitor, and a pin is inserted from this through hole to push up the coin-type electric double-layered capacitor for measuring limit strength not to detach the coin-type electric double-layered capacitor. Table 1 is a summary of these measurement values as a list.

TABLE 1

| SAMPLE | AVERAGE VALUE OF FIXING STRENGTH (N) | COVERAGE OR NON-COVERAGE OF END PORTION SURFACE OF LOWER TERMINAL PLATE BY SOLDER |
| --- | --- | --- |
| EXAMPLE 1 | 27.2 | NO |
| EXAMPLE 2 | 27.4 | NO |
| EXAMPLE 3 | 33.0 | YES |
| COMPARATIVE EXAMPLE 1 | 21.5 | NO |
| COMPARATIVE EXAMPLE 2 | 22.5 | NO |
| COMPARATIVE EXAMPLE 3 | 17.2 | NO |

As obvious from this Table 1, average values of the fixing strengths in Examples 1 to 3 show a range not smaller than 27 N and not larger than 33 N, and those in Comparative Examples 1 to 3 show a range not smaller than 17 N and not larger than 23 N. It is thus found in view of the average values of the fixing strengths that fixing strengths of the samples in Examples 1 to 3 are obviously higher. It is thereby found that the provision of lower terminal plates 3, 103, 203 and through holes 5, 105, 205 has led to significant improvement in fixing strength as compared with Comparative Examples 1 to 3.

Further, in Example 1, high fixing strength can be held unless the opening of through hole 5 is completely covered, and further, the projection length of lower terminal plate 3 from lower cover 2 is suppressed, thereby enabling miniaturization of the coin-type electric double-layered capacitor.

Moreover, in Example 3, the position of through hole 105 in lower terminal plate 103 is controlled, thereby to unite the solder that crawls up and spreads from inner peripheral surface 105c of through hole 105 with the solder that crawls up and spreads from outer peripheral surface 103d of lower terminal plate 103. Hence the surface of most of connection portion 103b of lower terminal plate 103 can be covered by solder. This can give higher fixing strength than in Examples 1 and 2 where through holes 5, 205 are just provided. This is obvious also in view of the average values of the fixing strength of Table 1, and the average value of the fixing strength in Example 3 is 1.2 times as large as the average value of the fixing strengths in Examples 1 and 2.

When Example 3 is taken as an example, in order to stabilize and unite the solder that crawls up and spreads from inner peripheral surface 105c of through hole 105 and the solder that crawls up and spreads from outer peripheral surface 103d of lower terminal plate 103, the upper limits of lengths X' and Y' shown in FIG. 4C may be set to not greater than 0.7 mm. There have been cases where, when the upper limits of the lengths of X' and Y' exceed 0.7 mm, a sample with insufficient unification of solder is generated in the mass-production process.

Meanwhile, since the mechanical strength of lower terminal plate 103 itself has an influence upon the fixing strength, the lower limits of the lengths X' and Y' may be set to not smaller than 0.2 mm. Namely, there have been cases where, when the lower limits of the lengths X' and Y' fall below 0.2 mm, a sample with its fixing strength lowered due to rupture of lower terminal plate 103 is generated in the mass-production process. Especially when the thickness of the cream solder is equivalent to or smaller than that of lower terminal plate 103, controlling through hole 105 in lower terminal plate 103 on the above length conditions can significantly improve the fixing strength.

Further, through hole 105 is provided at such a position where through hole 105 is not completely covered by the outer surface of the bottom of lower cover 102 and part thereof has a portion certainly in contact with the outside air. It is thereby possible to reliably perform degasification at the time of soldering and stably form a fillet that covers inner peripheral surface 105c of through hole 105, so as to obtain excellent fixing strength. Simultaneously with that, it is possible to suppress the projecting length of lower terminal plate 103 from the body section of the coin-type electric double-layered capacitor to the minimum, so as to realize miniaturization of the whole of the coin-type electric double-layered capacitor.

Moreover, in the case of constituting the capacitor-packaged unit including the coin-type electric double-layered capacitor as shown in FIGS. 3A and 3B, through hole 105 is placed in lower terminal plate 103 at such a predetermined position where solder 113c that spreads as exposed on upper surface 103c of lower terminal plate 103 is united with fillets 113a, 113b. In such a case, the predetermined position at which foregoing predetermined solder 113c is united with fillets 113a, 113b in the capacitor-packaged unit is a position with a distance from outer peripheral surface 103d to inner peripheral surface 105c of through hole 105 being not smaller than 0.2 mm and not greater than 0.7 mm.

With such a configuration, similarly to the descriptions given in the coin-type electric double-layered capacitor, it is possible to realize a highly reliable capacitor-packaged element having an excellent fixing strength. Simultaneously with that, it is possible to suppress the projecting length of lower terminal plate 103 from the body section of the coin-type electric double-layered capacitor to the minimum, so as to realize miniaturization and downsizing of the capacitor-packaged element.

INDUSTRIAL APPLICABILITY

Since the coin-type electric double-layered capacitor of the present invention has excellent mechanical strength especially in connection with the mounting board and is also suitable for miniaturization, its miniaturization has been advanced, and the coin-type electric double-layered capacitor can be expected to be utilized for backup of a power supply of mobile electronic equipment and the like which require resistance to a variety of impacts in use, and is thus useful.

The invention claimed is:

1. A coin-type electric double-layered capacitor comprising:
    a capacitor element with a pair of electrodes placed such that the electrodes confront each other through an insulating separator;
    a lower cover for housing the capacitor element impregnated with an electrolyte;
    an upper cover for sealing an opening of the lower cover through an insulating ring-shaped packing;
    an upper terminal plate having one end portion connected to an outer surface of the upper cover; and
    a lower terminal plate having a first end portion connected to an outer surface of the lower cover and a second end portion provided with a through hole,
    wherein at least part of the through hole is placed at a position where an outer surface of the lower cover runs.

2. The coin-type electric double-layered capacitor according to claim 1, wherein
    in a case where the capacitor is soldered onto a mounting board, solder fillets are formed on an inner peripheral surface of the through hole and an outer peripheral surface of the lower terminal plate, and the through hole is placed in the lower terminal plate at such a predetermined position where solder formed on a top face of the lower terminal plate is united with the fillets.

3. The coin-type electric double-layered capacitor according to claim 2, wherein
    a location of the predetermined position is defined by a distance ranging from not smaller than 0.2 mm to not greater than 0.7 mm measured between the outer peripheral surface of the lower terminal plate and the inner peripheral surface of the through hole.

4. A capacitor-packaged unit comprising:
    the coin-type electric double-layered capacitor according to claim 1;
    a mounting board to which the coin-type electric double-layered capacitor is to be mounted; and
    solder for electrically connecting the coin-type electric double-layered capacitor to the mounting board,
    wherein in a case where the capacitor is soldered onto the mounting board, fillets formed respectively on the inner peripheral surface of the through hole and the outer peripheral surface of the lower terminal plate are united with the solder by use of at least part of the through hole, which solder exposedly spreads on a top face of the lower terminal plate in a state continuous to the fillets.

5. The capacitor-packaged element according to claim 4, wherein
    the through hole in the lower terminal plate is placed at such a predetermined position where the solder exposedly spreading on the top surface of the lower terminal plate is united with the fillets, and
    a location of the predetermined position is defined by a distance ranging from not smaller than 0.2 mm to not greater than 0.7 mm measured between the outer peripheral surface of the lower terminal plate and the inner peripheral surface of the through hole.

* * * * *